(12) United States Patent
Park et al.

(10) Patent No.: US 12,125,197 B2
(45) Date of Patent: Oct. 22, 2024

(54) METHOD TO READ CHEST IMAGE

(71) Applicant: VUNO Inc., Seoul (KR)

(72) Inventors: Beomhee Park, Seoul (KR); Minki Chung, Seoul (KR); Seo Taek Kong, Yongin-si (KR); Younjoon Chung, Seoul (KR)

(73) Assignee: VUNO Inc., Seoul (KR)

( * ) Notice: Subject to any disclaimer, the term of this patent is extended or adjusted under 35 U.S.C. 154(b) by 461 days.

(21) Appl. No.: 17/466,697

(22) Filed: Sep. 3, 2021

(65) Prior Publication Data

US 2022/0076414 A1 Mar. 10, 2022

(30) Foreign Application Priority Data

Sep. 7, 2020 (KR) .......................... 10-2020-0114133

(51) Int. Cl.
*G06T 7/00* (2017.01)

(52) U.S. Cl.
CPC .. *G06T 7/0012* (2013.01); *G06T 2207/20081* (2013.01); *G06T 2207/20084* (2013.01); *G06T 2207/30048* (2013.01); *G06T 2207/30061* (2013.01)

(58) Field of Classification Search
CPC . G06T 2207/30061; G06T 7/149; G06T 7/12; G06T 2207/10116; G06T 2207/20081; G06T 7/11; G06T 2207/30048; G06T 7/0012; G06T 7/168; G06T 2207/20084; G06T 7/62; G06T 7/66; G06T 2207/10072; G06T 2207/20121; G06T 2207/30004; G06T 7/0014; G06T 7/162; G06T 2207/20004; G06T 2207/20056
USPC .......................................... 455/128
See application file for complete search history.

(56) References Cited

U.S. PATENT DOCUMENTS

| | | | |
|---|---|---|---|
| 8,594,409 B2 | 11/2013 | Kr10-1090375) | |
| 2006/0285751 A1* | 12/2006 | Wu | G06V 10/26 382/199 |
| 2007/0047790 A1* | 3/2007 | Dewaele | G06V 10/7553 382/128 |
| 2011/0237938 A1 | 9/2011 | Mizuno | |
| 2018/0276825 A1* | 9/2018 | Dai | G06T 7/187 |
| 2019/0340763 A1* | 11/2019 | Laserson | G06F 18/2321 |

FOREIGN PATENT DOCUMENTS

| | | |
|---|---|---|
| CN | 109801276 A | 5/2019 |
| JP | 2008-173223 A | 7/2008 |
| JP | 2011-206186 A | 10/2011 |
| KR | 10-1090375 B1 | 12/2011 |
| KR | 10-2012-0017356 A | 2/2012 |

(Continued)

*Primary Examiner* — Ajibola A Akinyemi
(74) *Attorney, Agent, or Firm* — Seed IP Law Group LLP

(57) ABSTRACT

According to an embodiment of the present disclosure, disclosed is a method to read a chest image. The method includes: determining whether or not to identify presence of cardiomegaly for a chest image; detecting a lung region and a heart region respectively which are included in the chest image, by using a neural network model, when it is determined to identify presence of cardiomegaly of the chest image; and calculating a cardiothoracic ratio of the chest image using the detected lung region and the detected heart region.

15 Claims, 8 Drawing Sheets

(56) References Cited

FOREIGN PATENT DOCUMENTS

| | | |
|---|---|---|
| KR | 10-1162599 B1 | 7/2012 |
| KR | 10-2019-0090986 A | 8/2019 |
| WO | 2020/099941 A1 | 5/2020 |

\* cited by examiner

METHOD TO READ CHEST IMAGE

CROSS-REFERENCE TO RELATED APPLICATIONS

This application claims priority to and the benefit of Korean Patent Application No. 10-2020-0114133 filed in the Korean Intellectual Property Office on Sep. 7, 2020, the entire contents of which are incorporated herein by reference.

BACKGROUND

Technical Field

The present disclosure relates to a method of reading a chest image, and more particularly, to a method of reading a chest image by using a neural network model.

Description of the Related Art

A medical imaging technology is a useful technology that allows medical personnel to understand the physical state of various organs in the human body. The medical imaging technology in the related art includes digital radiographic image (X-ray), Computed Tomography (CT), Magnetic Resonance Imaging (MRI), and the like. The imaging diagnosis method has various advantages and disadvantages and various points to consider in the application of the technology.

Although CT or MRI can show the body organs in high-quality and high-resolution images, it is not suitable for all types of patients because of the large amount of irradiation, the complicated inspection procedure, and high cost. On the other hand, chest radiographic imaging is a very useful diagnosis method capable of obtaining the large amount of medical information through a very simple procedure, and is the most basic inspection method formed on almost all patients who visit the hospital.

The chest radiographic imaging is primarily used for diagnosing various chest and heart-related diseases, as well as basic health conditions or other disease of patients. Particularly, the digitalization of chest radiography has made it possible to diagnose various diseases much more simply and accurately than previous analog methods. Currently, a chest radiography inspection is mostly performed in private hospitals, as well as general hospitals, such as university hospitals, but due to the lack of radiology specialists, each clinician is in charge of reading subjectively without the reading by the experts.

Accordingly, very clearly visible lung disease, such as lung cancer, can be diagnosed, but misdiagnosis of early cancer, tuberculosis, or other diseases that are difficult to detect without the help of specialists are adversely affecting public health. In particular, there is little interest and knowledge about heart disease other than lung disease captured by chest imaging, consequently, due to the lack of knowledge, serious social problems, such as delay in the initial diagnosis of heart disease, may occur.

Although chest radiographic imaging is an important and major means of use compared to other technologies, such as CT or MRI, studies on detecting abnormal conditions from CT or MRI images have been extensively conducted, but there are not many studies based on the radiographic imaging. In most cases, radiographic images are read a lot by radiologists or clinicians, but misinterpretation frequently occurs due to low image quality.

Korean Patent Application Laid-Open No. 10-2019-0090986 discloses a system and a method of supporting chest medical image reading.

BRIEF SUMMARY

The present disclosure is conceived in response to the background art, and has been made in an effort to provide a method of reading a chest image which is capable of improving user's experience.

An embodiment of the present disclosure provides a method to read a chest image, the method including: determining whether or not to identify presence of cardiomegaly for a chest image; detecting a lung region and a heart region respectively which are included in the chest image, by using a neural network model, when it is determined to identify presence of cardiomegaly for the chest image; and calculating a cardiothoracic ratio of the chest image using the detected lung region and the detected heart region.

As an alternative embodiment of the method to read the chest image, the determining whether or not to identify presence of cardiomegaly for the chest image may include: detecting a position of a rib included in the chest image using the neural network model; determining a respiratory level of a lung according to the detected position of the rib; and determining whether or not to identify presence of cardiomegaly for the chest image based on the determined respiratory level of the lung.

As the alternative embodiment of the method to read the chest image, the determining whether or not to identify presence of cardiomegaly for the chest image may include: classifying the chest image as a first type image acquired according to a first photographic direction or a second type image acquired according to a second photographic direction different from the first photographic direction; and determining whether or not to identify presence of cardiomegaly for the chest image, based on the classification result of the chest image and age information on a photographic target of the chest image.

As the alternative embodiment of the method to read the chest image, the determining whether or not to identify presence of cardiomegaly for the chest image may include: classifying the chest image as a posterior anterior (PA) image or an anterior posterior (AP) image; and determining to identify presence of cardiomegaly for the chest image, when the chest image is the PA image and an image of an adult.

As the alternative embodiment of the method to read the chest image, the determining whether or not to identify presence of cardiomegaly for the chest image may further include: determining not to identify presence of cardiomegaly for the chest image, when the chest image is the AP image or the chest image is not an image of an adult.

As the alternative embodiment of the method to read the chest image, the determining whether or not to identify presence of cardiomegaly for the chest image may further include: determining to identify presence of cardiomegaly for that the cardiomegaly reading about the chest image, and applying cardiothoracic ratio criteria for determining cardiomegaly differently from cardiothoracic ratio criteria corresponding to a PA image of an adult, when the chest image is the AP image or the chest image is not an image of an adult.

As the alternative embodiment of the method to read the chest image, the classifying the chest image as the posterior anterior (PA) image or the anterior posterior (AP) image may include classifying the chest image as the PA image or the AP image using metadata which is matched on the chest image and stored.

As the alternative embodiment of the method to read the chest image, the method may further include: detecting the lung region included in the chest image by calculating the chest image using the neural network model, and matching the detected lung region with finding information detected from a finding detection network, when it is determined not to identify presence of cardiomegaly for the chest image; and generating a readout about the chest image based on the matching of the finding information and the lung region.

As the alternative embodiment of the method to read the chest image, the method may further include: detecting a spinal line included in the chest image by calculating the chest image using the neural network model; and correcting the chest image according to the detected spinal line.

As the alternative embodiment of the method to read the chest image, the calculating the cardiothoracic ratio of the chest image using the detected lung region and the detected heart region may include: calculating a lung diameter, which is the longest distance from a left boundary line of a left lung sub region included in the lung region to a right boundary line of a right lung sub region included in the lung region; calculating a heart diameter, which is the longest diameter in the heart region; and calculating the cardiothoracic ratio according to the lung diameter and the heart diameter.

As the alternative embodiment of the method to read the chest image, the method may further include: generating a user interface (UI) for visualizing and displaying the calculated cardiothoracic ratio together with the lung diameter and the heart diameter; and transmitting the generated user interface to a terminal.

As the alternative embodiment of the method to read the chest image, the method may further include: receiving a user adjustment input for the visualized lung diameter and the visualized heart diameter; recalculating the lung diameter and the heart diameter by adjusting calculation criteria of the lung diameter and the heart diameter so as to correspond to the user adjustment input; and recalculating the cardiothoracic ratio according to the user adjustment input.

As the alternative embodiment of the method to read the chest image, the method may further include: determining whether it is cardiomegaly or not from the chest image according to the calculated cardiothoracic ratio; and generating a readout about the chest image based on the determination whether it is cardiomegaly or not.

Another embodiment of the present disclosure provides a computer program stored in a computer readable storage medium. When the computer program is executed in one or more processors, the computer program performs following operations to perform chest image reading, the operations including: determining whether or not to identify presence of cardiomegaly for a chest image; detecting a lung region and a heart region respectively which are included in the chest image, by using a neural network model, when it is determined to identify presence of cardiomegaly for the chest image; and calculating a cardiothoracic ratio of the chest image using the detected lung region and the detected heart region.

Another embodiment of the present disclosure provides a server for providing chest image reading information. The server may include a processor comprising one or more core, a network unit, and a memory. The processor may be configured to: determine whether or not to identify presence of cardiomegaly for a chest image; detect a lung region and a heart region respectively which are included in the chest image, by using a neural network model, when it is determined to identify presence of cardiomegaly for the chest image; and calculate a cardiothoracic ratio of the chest image using the detected lung region and the detected heart region.

Another embodiment of the present disclosure provides a terminal for providing chest image reading information. The terminal may include: a processor comprising one or more core; a memory; and an output unit providing a user interface. The user interface may visualize and display a cardiothoracic ratio of the chest image, calculated using a lung region and a heart region detected from a chest image.

Another embodiment of the present disclosure provides a terminal for providing chest image reading information. The terminal may include: a processor comprising one or more core; a memory; and an output unit providing a user interface. The user interface may display a readout about the chest image, which is generated based on whether it is cardiomegaly or not determined according to the cardiothoracic ratio.

According to the embodiment of the present disclosure, the present disclosure provides the method of reading a chest image, which may improve user's experience.

DETAILED DESCRIPTION

Figure 1:
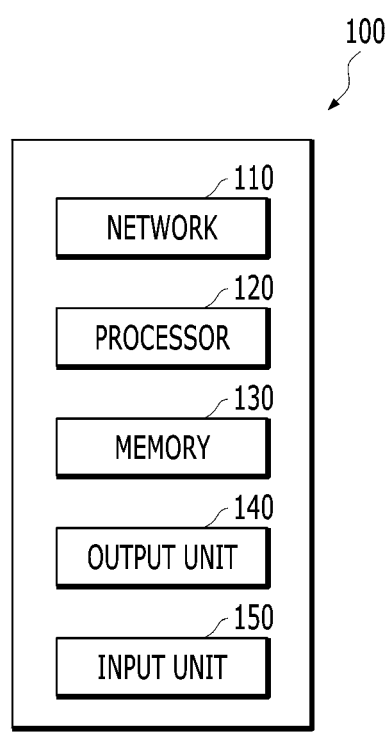
FIG. 1 is a block diagram of a computing device performing operations for providing a method of reading a chest image according to an embodiment of the present disclosure.

Various embodiments are described with reference to the drawings. In the present specification, various descriptions are presented for understanding the present disclosure. However, it is obvious that the embodiments may be carried out even without a particular description.

Terms, "component," "module," "system," and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

A term "or" intends to mean comprehensive "or" not exclusive "or." That is, unless otherwise specified or when it is unclear in context, "X uses A or B" intends to mean one of the natural comprehensive substitutions. That is, when X uses A, X uses B, or X uses both A and B, "X uses A or B" may be applied to any one among the cases. Further, a term "and/or" used in the present specification shall be understood to designate and include all of the possible combinations of one or more items among the listed relevant items.

It should be understood that a term "include" and/or "including" means that a corresponding characteristic and/or a constituent element exists. Further, a term "include" and/or "including" means that a corresponding characteristic and/or a constituent element exists, but it shall be understood that the existence or an addition of one or more other characteristics, constituent elements, and/or a group thereof is not excluded. Further, unless otherwise specified or when it is unclear in context that a single form is indicated in context, the singular shall be construed to generally mean "one or more" in the present specification and the claims.

The term "at least one of A and B" should be interpreted to mean "the case including only A," "the case including only B," and "the case where A and B are combined."

Those skilled in the art shall recognize that the various illustrative logical blocks, configurations, modules, circuits, means, logic, and algorithm operations described in relation to the embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

For instance, the term "unit" may include any electrical circuitry, features, components, an assembly of electronic components or the like. That is, "unit" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "unit." In some embodiments, the various units described herein may be included in or otherwise implemented by processing circuitry such as a microprocessor, microcontroller, or the like.

The description about the presented embodiments is provided so as for those skilled in the art to use or carry out the present disclosure. Various modifications of the embodiments will be apparent to those skilled in the art. General principles defined herein may be applied to other embodiments without departing from the scope of the present disclosure. Therefore, the present disclosure is not limited to the embodiments presented herein. The present disclosure shall be interpreted within the broadest meaning range consistent to the principles and new characteristics presented herein.

In an embodiment of the present disclosure, a server may also include other configurations for performing a server environment. The server may include all of the predetermined (or selected for other embodiments) types of devices. The server is a digital device, and may be a digital device, such as a laptop computer, a notebook computer, a desk top computer, a web pad, a mobile phone, which is equipped with a processor, includes a memory, and has computing capability. The server may be a web server processing the service. The kind of foregoing server is merely an example, and the present disclosure is not limited thereto.

In the present specification, a neural network, an artificial neural network, and a network function may often be interchangeably used.

The term "image" or "image data" used throughout the detailed description and the claims of the present disclosure refer to multidimensional data composed of discrete image elements (for example, pixels in a 2-dimensional image), and in other words, is the term referring to a target visible to the eye (for example, displayed on a video screen) or a digital representation of the target (for example, a file corresponding to a pixel output of a CT or MRI detector).

For example, "image" or imaging" may be a medical image of a subject collected by Computed Tomography (CT), Magnetic Resonance Imaging (MRI), fundus image, ultrasonic rays, or other predetermined (or selected, for other embodiments) medical imaging systems publicly known in the art of the present disclosure. The image is not necessarily provided in a medical context, but may also be provided in a non-medical context, such as X-ray imaging for security screening.

Throughout the detailed description and the claims of the present disclosure, the "Digital Imaging and Communications in Medicine (DICOM)" standard is a term collectively referring to various standards used in digital imaging expression and communication in medical devices, and the DICOM standard is published by the allied committee formed by the American College of Radiology (ACR) and American National Electrical Manufacturers Associations (NEMA).

Throughout the detailed description and the claims of the present disclosure, a "Picture Archiving and Communication System (PACS)" is a term that refers to a system that stores, processes, and transmits images in accordance with the DICOM standard, and medical images obtained by using digital medical imaging equipment, such as X-ray, CT, and MRI, may be stored in the DICOM format and transmitted to terminals inside and outside a hospital through a network, and a reading result and a medical record may be added to the medical image.

FIG. 1 is a block diagram of a computing device 100 performing operations for providing a method of reading a chest image according to an embodiment of the present disclosure.

In the present disclosure contents, the computing device 100 may include a predetermined (or selected, for other embodiments) type of server or a predetermined (or selected) type of terminal. For example, when the computing device 100 is operated as a server, the descriptions of a network 110, a processor 120, and a memory 130 among the components of FIG. 1 may be included as the range of the components of the computing device 100. For another example, when the computing device 100 is operated as a terminal, all of the components illustrated in FIG. 1 may be included in the range of the components of the computing device 100.

Accordingly, since the network 110, the processor 120, and the memory 130 are the components commonly used in the server and the terminal, it will be clearly understood by those skilled in the art that the characteristics thereof can be used interchangeably in both the server and the terminal.

The processor 120 may determine whether a reading of a chest image is possible. The chest image may include any type of image having the chest of X-ray, CT, MRI, and the like as a domain.

In the embodiment, the processor 120 may determine whether or not to identify presence of cardiomegaly for a chest image. In the embodiment, the determining whether or not to identify presence of cardiomegaly for the chest image may include determining whether the chest image is the chest image in which it is possible to calculate a cardiothoracic ratio.

The processor 120 may detect a position of a rib included in the chest image by calculating a chest image by using a neural network model. The processor 120 may detect the rib included in the chest image by using a convolutional neural network model.

The processor 120 may determine a respiratory level of a lung according to the position of the rib. The processor 120 may determine whether or not to identify presence of cardiomegaly for the chest image according to the respiratory level of the lung.

The processor 120 may determine the respiratory level based on a segmented region of the rib. The processor 120 may determine the respiratory level of a user by comparing the position of the rib and a reference line. When the rib is lower than the reference line, the processor 120 may determine that the respiratory level is normal. When the respiratory level is normal, the processor 120 may determine to identify presence of cardiomegaly for the corresponding chest image.

When the rib is located above the reference line, the processor 120 may determine that the respiratory level is abnormal. When the respiratory level is abnormal, the processor 120 may determine not to identify presence of cardiomegaly for the corresponding chest image. For example, when the chest image is photographed, in the case where the user does not take a deep breath, the rib may be located above the reference line. In this case, it is difficult to determine whether the user has cardiomegaly, so that the processor 120 may determine not to identify presence of cardiomegaly for the chest image in which the respiratory level is abnormal.

The processor 120 may display information on whether or not to identify presence of cardiomegaly for the chest image on a user interface. The processor 120 may determine to notify the corresponding user of information about the need to re-photograph the chest image by giving a notification to the user on whether or not to identify presence of cardiomegaly for the chest image. In the embodiment, when the computing device 100 is operated as the server, the processor 120 may transmit a message for notifying the information that the re-photographing is needed to the user terminal. In another embodiment, when the computing device 100 is operated as the terminal, the processor 120 may output the information that the re-photographing is needed on a display.

Otherwise, when determining to identify presence of cardiomegaly for the chest image, the processor 120 may immediately progress the reading whether cardiomegaly or not. Further, when the processor 120 is operated as the terminal, in the case where determining not to identify presence of cardiomegaly for the chest image, the processor 120 may display the information indicating that it is impossible to identify presence of cardiomegaly for the corresponding image on the user interface. Further, when the processor 120 is operated as the server, in the case where determining not to identify presence of cardiomegaly for the chest image, the processor 120 may transmit the information indicating that it is impossible to identify presence of cardiomegaly for the corresponding image to the user terminal.

The processor 120 may apply different criteria for reading cardiomegaly depending on the type of chest image.

The processor 120 may classify the chest image into a first type image acquired according to a first photographic direction and a second type image acquired according to a second photographic direction different from the first photographic direction. The processor 120 may determine whether or not to identify presence of cardiomegaly for the chest image according to the classified image type. For example, the first type image may include a Posterior Anterior (PA) image, and the second type image may include an Anterior Posterior (AP) image. In addition, the processor 120 may determine whether or not to identify presence of cardiomegaly for the chest image based on the classified image type and additionally based on attribute information about a photographic target (for example, an examinee) of the chest image. For example, the attribute information about the photographic target may include age information or information whether the photographic target is an adult.

In the embodiment, the processor 120 may classify the chest image into the PA image or the AP image. The PA image is the image obtained by photographing a chest X-ray while the patient is standing. The AP image is the image obtained by photographing a chest X-ray while the patient is lying down. For example, for patients with impaired mobility, a chest X-ray may be photographed while the patient lies down because it is difficult to take the chest X-ray of the patient while the patient is standing. When the patient is lying down, the lung may be photographed in a more laterally spread out state than the case where the patient is standing. As described above, whether or not to identify presence of cardiomegaly for the chest image may be differently determined depending on the type of chest image.

When the chest image is classified as the AP image, the processor 120 may determine not to identify presence of cardiomegaly for the chest. In an additional embodiment, in response to the determination not to identify presence of cardiomegaly for the chest image, the processor 120 may detect a lung region included in the chest image by calculating the chest image by using the neural network model, and match the detected lung region with finding information detected from a finding detection network. Then, the processor 120 may generate a readout about the chest image based on the matching of the finding information and the lung region.

In the embodiment of the present disclosed contents, when the chest image is classified into the PA image, the processor 120 may determine to identify presence of cardiomegaly for the chest image based on age information of the examinee related to the chest image. When the chest image is classified into the PA image and the examinee corresponding to the chest image is an image of an adult, the processor 120 may determine not to identify presence of cardiomegaly for the chest image.

In the embodiment, when the chest image is classified into the PA image of the adult, the processor 120 may determine to identify presence of cardiomegaly for the chest image, and when the chest image is not classified into the PA image of the adult, the processor 120 may determine not to identify presence of cardiomegaly for the chest image. For example, examples of the case where the chest image is not the PA image of the adult may include a PA image of a child, an AP image of a child, a lateral image of a child, an AP image of an adult, or a lateral image of an adult.

In the embodiment, when the chest image is classified into the AP image or it is determined that the examinee related to the chest image is not an image of an adult, the processor 120 may determine not to identify presence of cardiomegaly for the chest image.

In additional embodiment, in response to the determination not to identify presence of cardiomegaly for the chest image, the processor 120 may detect a lung region included in the chest image by calculating the chest image by using the neural network model and match the detected lung region with finding information detected from a finding detection network. Then, the processor 120 may generate a readout about the chest image based on the matching of the finding information and the lung region.

In the embodiment, in response to the determination not to identify presence of cardiomegaly for the chest image, the processor 120 may determine to terminate the cardiomegaly reading, but may generate other meaningful information, in addition to the cardiomegaly reading through the matching of the detected lung region and the finding information by detecting the lung region and acquiring the finding information.

The processor 120 may classify the chest image by using meta data which is matched to the chest image and stored. The meta data which is matched to the chest image and stored may be data obtained from the DICOM. For example, the PA image and the AP image may be photographed by different X-ray devices, respectively. The meta data may include information about the X-ray device that photographs the corresponding image. In addition, the meta data may include the age information about the photographic target (examinee) of the chest image or information about whether the photographic target (examinee) of the chest image is an image of an adult. For example, in the case of the chest image photographed by a first X-ray, the processor 120 may classify the corresponding chest image into the PA image, and in the case of the chest image photographed by a second X-ray, the processor 120 may classify the corresponding chest image into the AP image. The processor 120 may determine whether the chest image is the PA image of the adult by using the meta data which is matched to the chest image and stored, and determine whether or not to identify presence of cardiomegaly for the chest image according to the determination. The particular description of the foregoing image classification is merely illustrative, and the present disclosure is not limited thereto.

The processor 120 may differently apply cardiothoracic ratio criteria for determining cardiomegaly according to the result of the classification of the chest image or the result of the determination whether or not to identify presence of cardiomegaly for the chest image. For example, in the case of the image that is not the PA image of the adult, and the cardiothoracic ratio is equal to or larger than 0.6, the chest image may be determined as the cardiomegaly, and in the case of the PA image of the adult and the cardiothoracic ratio is equal to or larger than 0.5, the chest image may be determined as the cardiomegaly. The particular description of the foregoing application of the different cardiothoracic ratio criteria is merely illustrative, and the present disclosure is not limited thereto.

The processor 120 may perform pre-processing on the chest image for reading cardiomegaly.

The processor 120 may detect a spinal line included in the chest image by calculating the chest image by using the neural network model. The processor 120 may calculate the chest image by using the neural network model. The processor 120 may perform segmentation on a spinal region included in the chest image. The processor 120 may detect the spinal line by using the segmented spinal region. The spinal line may be the center line of the spinal region.

The processor 120 may correct the chest image according to the spinal line. The processor 120 may compare an angle between the spinal line and a horizontal or vertical line that is a border of the chest image. The processor 120 may align the chest image so that the spinal line is parallel to the border of the chest image. That is, the processor 120 may rotate the chest image by using the spinal line so that the chest image is not distorted.

The processor 120 may detect each of a lung region and a heart region included in the chest image by calculating the chest image by using the neural network model. The neural network model may be the model for detecting an object included in the chest image. The neural network model may be the model for performing segmentation on the object included in the chest image.

The neural network model for calculating the chest image may be a deep neural network. Throughout the present specification, a nerve network, a network function, and the neural network may be used with the same meaning. A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The deep neural network may include a Convolutional Neural Network (CNN), a Recurrent Neural Network (RNN), a Restricted Boltzmann Machine (RBM), a Deep Belief Network (DBN), a Q network, a U network, Siamese network, and the like.

The convolutional neural network is a kind of deep neural network, and includes a neural network including the convolutional layer. The convolutional neural network is a class of multilayer perceptrons designed to use minimal preprocessing. The CNN may consist of one or more several convolutional layers and artificial neural network layers combined with the convolutional layers. The CNN may additionally use a weight and pooling layers. Due to the structure, the CNN may sufficiently use input data of a two-dimensional structure. The convolutional neural network may be used to recognize an object in an image. The convolutional neural network may represent and process image data with a matrix having a dimension. For example, in the case of image data encoded in red-green-blue (RGB), each R, G, and B color may be represented as two-dimensional (for example, in the case of a two-dimensional image) matrix. That is, a color value of each pixel of the image data may be a component of the matrix, and a size of the matrix may be the same as the size of the image. Accordingly, the image data may be represented with three two-dimensional matrixes (a three-dimensional data array).

A convolutional process (input/output of the convolutional layer) may be performed by multiplying a convolutional filter and a component of the matrix in each position of the image while moving the convolutional filter in the convolutional neural network. The convolutional filter may be formed of an n×n matrix. The convolutional filter may be formed of the fixed type of filter of which the number of pixels is generally smaller than the total number of pixels of the image. That is, in the case where an m×m image is input to the convolutional layer (for example, a convolutional layer in which a size of the convolutional filter is n×n), the matrix representing n×n pixels including each pixel of the image may be a multiplication of the convolutional filter and the component (that is, the multiplication of each component of the matrix). By the multiplication of the convolutional filter and the component, the component matching the convolutional filter may be extracted from the image. For example, a 3×3 convolutional filter for extracting upper and lower linear components from an image may be configured as [[0,1,0], [0,1,0], [0,1,0]]. When the 3×3 convolutional filter for extracting the upper and lower linear components from the image is applied to the input image, the upper and lower linear components matching the convolutional filter are extracted from the image and output. The convolutional layer may apply the convolutional filter to each matrix (that is, in the case of R, G, B coding image, R, G, and B colors) for each channel representing the image. The convolutional layer may extract a feature matching the convolutional filter from the input image by applying the convolutional filter to the input image. The filter value (that is, the value of each component of the matrix) of the convolutional filter may be updated by backpropagation in the training process of the convolutional neural network.

A sub-sampling layer is connected to the output of the convolutional layer to simplify the output of the convolutional layer and reduce the amount of use of the memory and the amount of computation. For example, when the output of the convolutional layer is input to the pooling layer having a 2×2 max pooling filter, the image may be compressed by outputting the maximum value included in each patch for each 2×2 patch in each pixel of the image. The foregoing pooling may also be the scheme of outputting a minimum value in the patch or outputting an average value of the patch, and a predetermined (or selected, for other embodiments) pooling scheme may be included in the present disclosure.

The convolutional neural network may include one or more convolutional layers and a sub-sampling layer. The convolutional neural network may extract a feature from an image by repeatedly performing a convolutional process and a sub-sampling process (for example, the foregoing max pooling and the like). Through the repeated convolutional process and the sub-sampling process, the neural network may extract a global feature from the image.

The output of the convolutional layer or the sub-sampling layer may be input to a fully connected layer. The fully connected layer is the layer in which all of the neurons in one layer are connected to all of the neurons in an adjacent layer. The fully connected layer may mean a structure in which all of the nodes of each layer are connected to all of the nodes of another layer in the neural network.

In the embodiment of the present disclosure, in order to perform segmentation on the chest image, the neural network may include a Deconvolutional Neural Network (DCNN). The deconvolutional neural network performs a similar operation to an operation of calculating the convolutional neural network in a reverse direction. The deconvolutional neural network may output a feature extracted in the convolutional neural network with a feature map related to original data. A particular configuration of the convolutional neural network is discussed in more detail in U.S. Pat. No. 9,870,768B2, which is incorporated by reference in its entirety in the present application.

Figure 2A:
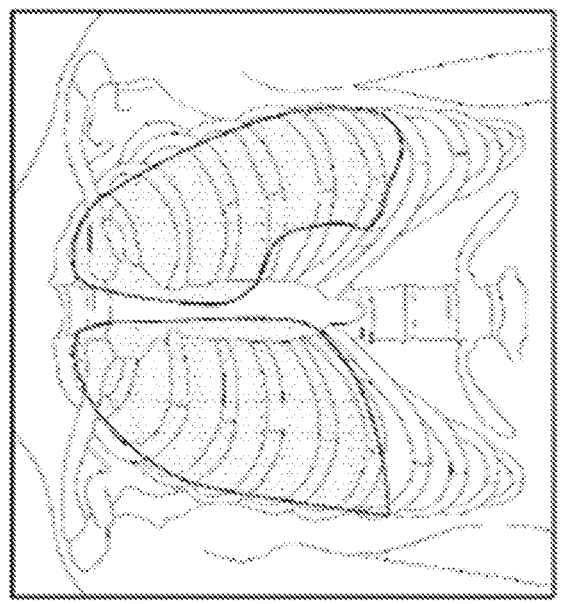
FIGS. 2A, 2B, and 2C are diagrams illustrating an example of a chest image and a chest image reading result according to the embodiment of the present disclosure.
Figure 2B:
Figure 2C:

The processor 120 may calculate a cardiothoracic ratio by using the detected lung region and heart region. The processor 120 may calculate the cardiothoracic ratio by using the segmented lung and heart. Hereinafter, this will be described with reference to FIGS. 2A, 2B, AND 2C. FIGS. 2A, 2B, AND 2C are diagrams illustrating an example of a result of the detection of the lung and the heart from the chest image according to the embodiment of the present disclosure. FIG. 2A is a diagram illustrating an example of a chest image according to the embodiment of the present disclosure. FIG. 2B is a diagram illustrating an example of a result of the segmentation of the lung included in the chest image according to the embodiment of the present disclosure. FIG. 2C is a diagram illustrating an example of a result of the segmentation of the heart included in the chest image according to the embodiment of the present disclosure.

The processor 120 may calculate a lung diameter that is the longest distance from a left boundary line of a left lung region included in the lung region to a right boundary line of a right lung region included in the lung region. The processor 120 may calculate the lung diameter by using the two lung regions included in the chest image. The processor 120 may calculate a distance from the left-most end point of the left lung region to the right-most end point of the right lung region. The processor 120 may calculate the lung diameter. When the computing device 100 is operated as the server, the processor 120 may generate a user interface in which the lung diameter is visualized and transmit the generated user interface to the terminal. When the computing device 100 is operated as the terminal, the processor 120 may visualize the lung diameter and display the visualized lung diameter on the user interface.

The processor 120 may calculate a heart diameter that is the longest diameter in the heart region. The processor 120 may calculate the heart diameter for the segmented heart region included in the chest image. The processor 120 may calculate a distance from the left-most end point to the right-most end point in the heart region. The processor 120 may calculate the heart diameter. When the processor 120 is operated in the server, the processor 120 may generate a user interface that is capable of visualizing the heart diameter and transmit the generated user interface to the terminal. When the processor 120 is operated in the terminal, the processor 120 may visualize the heart diameter and display the visualized heart diameter on the user interface.

The processor 120 may calculate the cardiothoracic ratio according to the lung diameter and the heart diameter. The processor 120 may calculate a ratio of the lung diameter and the heart diameter. The cardiothoracic ratio may be the ratio of the lung diameter and the heart diameter. The cardiothoracic ratio may be a value obtained by dividing the heart diameter by the lung diameter. The cardiothoracic ratio may be a value serving as the basis of the determination of the cardiomegaly.

When the processor 120 is operated in the terminal, the processor 120 may make the terminal to visualize and display the cardiothoracic ratio. When the processor 120 is operated in the server, the processor 120 may transmit the user interface which is capable of visualizing and displaying the cardiothoracic ratio to the terminal.

Figure 3:
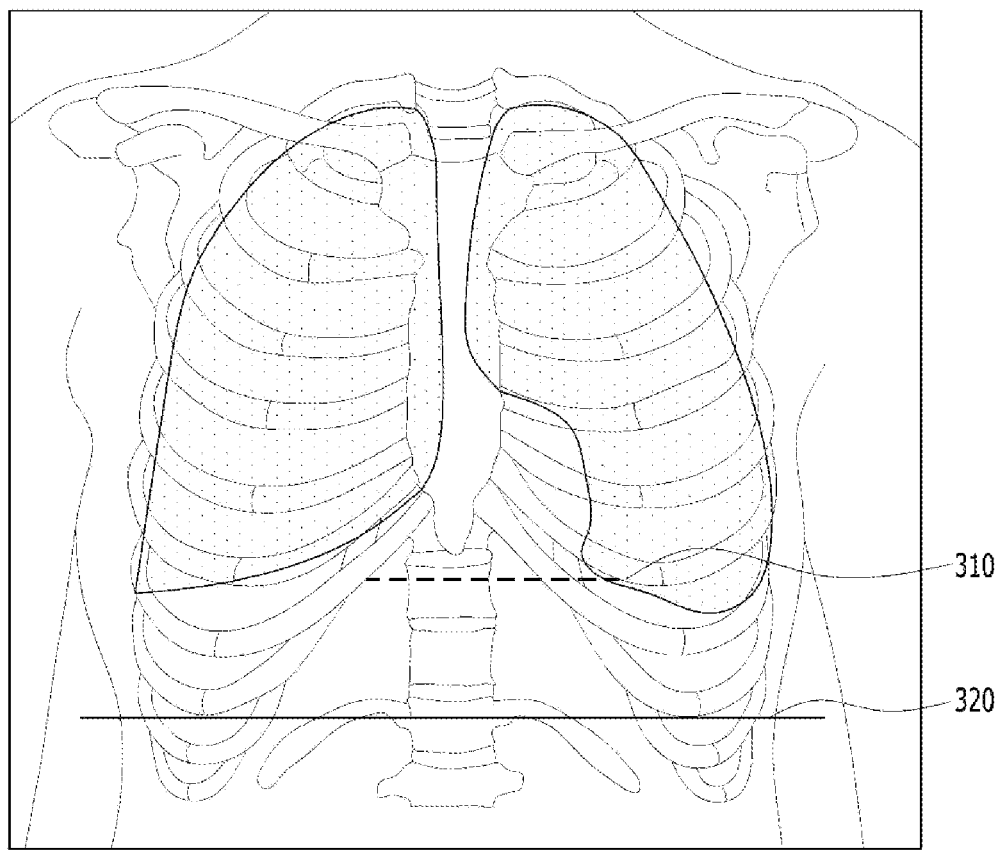
FIG. 3 is a diagram illustrating an example of a chest image reading result according to the embodiment of the present disclosure.

The processor 120 may visualize and display the lung diameter and the heart diameter. FIG. 3 is a diagram illustrating an example of a result of the visualization and the display of the lung diameter and the heart diameter according to the embodiment of the present disclosure. A first visualization result 310 illustrated in FIG. 3 is an example of the illustration of the heart diameter. A second visualization result 320 illustrated in FIG. 3 is an example of the illustration of the lung diameter. The visualization result according to the embodiment of the present disclosure may be displayed in various methods, and is not limited to the result illustrated in FIG. 3.

The processor 120 may determine whether a patient of the chest image has cardiomegaly according to the cardiothoracic ratio. The processor 120 may determine whether the patient that is the target of the chest image has cardiomegaly by comparing the cardiothoracic ratio and a reference value.

The processor 120 may determine whether the patient of the chest image has cardiomegaly by differently applying the reference value that is the reference for determining cardiomegaly according to whether the chest image is the PA image of the adult as described above.

The processor 120 may generate a readout for the chest image based on whether the patient of the chest image has cardiomegaly. The processor 120 may generate a readout including information about whether the patient is normal or abnormal for the cardiomegaly symptom.

When the processor 120 is operated in the terminal, the processor 120 may display the readout on the user interface together with the chest image. The processor 120 may generate a separate notification or display a visualization indication on the user interface of the chest image that is determined as cardiomegaly.

The processor 120 may not display the visualized cardiothoracic ratio display in response to a user setting input. For example, a display object that can turn the cardiothoracic ratio display off or on may be displayed on the user interface. The processor 120 may display or may not display the visualized cardiothoracic ratio according to the user's setting.

The processor 120 may adjust and display the visualized lung diameter and heart diameter in response to a user adjustment input. The user adjustment input may be drag-and-drop for the result of the visualization of the lung diameter or the heart diameter illustrated in FIG. 3. For example, when the user determines that the heart or lung diameter is not properly calculated based on the result of the visualization, the user make the processor 120 calculate the heart or lung diameter again by adjusting the result of the visualization.

The processor 120 may calculate the lung diameter and the heart diameter again by adjusting the criteria of the calculation of the lung diameter and the heart diameter so as to correspond to the user adjustment input.

The processor 120 may calculate the cardiothoracic ratio according to the user adjustment input again.

The computing device 100 for providing a method of reading a chest image according to an embodiment of the present disclosure may include a network unit 110, the processor 120, a memory 130, an output unit 140, and an input unit 150.

In the present disclosure contents, the computing device 100 may include a predetermined (or selected, for other embodiments) type of user terminal or a predetermined (or selected) type of server. The foregoing components of the computing device 100 are illustrative, and some may be excluded or additional components may be included. For example, when the computing device 100 means a server, the output unit 140 of the computing device 100 may be excluded.

The network unit 110 may transceive the chest image and the like according to the embodiment of the present disclosure with another computing device, server, and the like. Further, the network unit 110 enables the plurality of computing devices to communicate, so that the operations for training the model may be distributed and performed in the plurality of computing devices. The network unit 110 enables the plurality of computing devices to communicate, so that the calculation for training the model by using the network function may be distributed and processed.

The network unit 110 according to the embodiment of the present disclosure may be operated based on any type of wired/wireless communication technology currently used and implemented, such as near field (short-range) communication technology, long-distance communication technology, and wire communication technology, and wireless communication technology, and may be used in other networks.

The processor 120 may be formed of one or more cores, and may include a processor, such as a central processing unit (CPU), a general purpose graphics processing unit (GPGPU), and a tensor processing unit (TPU) of the computing device, for training a model. The processor 120 may read a computer program stored in the memory 130 and provide a model training method according to an embodiment of the present disclosure. According to the embodiment of the present disclosure, the processor 120 may perform a calculation for providing the model training method.

The memory 130 may store a computer program for providing the method of reading the chest image according to the embodiment of the present disclosure, and the stored computer program may be read and driven by the processor 120. A database according to the embodiment of the present disclosure may be the memory 130 included in the computing device 100. Otherwise, the database may also be a memory included in a separate server or a computing device interlinked with the computing device 100.

The memory 130 according to the embodiments of the present disclosure may store a program for an operation of the processor 120, and may temporarily and permanently store input/output data or events. The memory 130 may store data for display and sound. The memory 130 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The output unit 140 according to the embodiment of the present disclosure may display a User Interface (UI) for providing a chest image reading result. The output unit 140 may display the user interface illustrated in FIGS. 2 and 3. The user interfaces illustrated in the drawing and described above are merely illustrative, and the present disclosure is not limited thereto.

The output unit 140 according to the embodiment of the present disclosure may output the predetermined (or selected, for other embodiments) form of information generated or determined by the processor 120 and the predetermined (or selected) form of information received by the network unit 110.

According to an embodiment of the present disclosure, a terminal for displaying a user interface is disclosed. The user interface of the terminal may visualize and display a cardiothoracic ratio calculated by using the lung region and the heart region detected from the input chest image, and the cardiothoracic ratio may be displayed by visualizing the lung diameter and the heart diameter. On the user interface, whether the patient of the chest image has cardiomegaly is determined according to the cardiothoracic ratio, and a readout for the chest image may be displayed based on whether the patient of the chest image has cardiomegaly.

In the embodiment of the present disclosure, the output unit 140 may include at least one of a Liquid Crystal Display (LCD), a Thin Film Transistor Liquid Crystal Display (TFT LCD), an Organic Light Emitting Diode (OLED), a flexible display, and a 3D display. Among them, some display modules may be configured as a transparent type or a light transmission type so that the outside can be seen through the display modules. This may be referred to as a transparent display module, and a representative example of the transparent display module includes a Transparent OLED (TOLED).

A user input may be received through the input unit 150 according to the embodiment of the present disclosure. The input unit 150 according to the embodiment of the present disclosure may be provided with keys and/or buttons, or physical keys and/or buttons on the user interface for receiving the user input. A computer program for controlling a display according to the embodiments of the present disclosure may be executed according to the user input through the input unit 150.

The input unit 150 according to the embodiments of the present disclosure may receive a signal by detecting a button manipulation or a touch input of a user or receive a voice or an operation of a user and the like through a camera or a microphone and convert the received signal, voice, or operation to an input signal. To this end, speech recognition technology or motion recognition technology may be used.

The input unit 150 according to the embodiments of the present disclosure may also be implemented as external input equipment connected with the computing device 100. For example, the input equipment may be at least one of a touch pad, a touch pen, a keyboard, and a mouse for receiving a user input, but this is merely an example, and the present disclosure is not limited thereto.

The input unit 150 according to the embodiments of the present disclosure may recognize a touch input of a user. The input unit 150 according to the embodiments of the present disclosure may have the same configuration as that of the output unit 140. The input unit 150 may be formed of a touch screen implemented so as to receive a selection input of a user. In the touch screen, any one of a contact type capacitance method, an infrared light sensing method, a Surface Ultrasonic Wave (SAW) method, a piezoelectric method, and a resistive film method may be used. The detailed description for the foregoing touch screen is merely illustrative according to the embodiments of the present disclosure, and various touch screen panels may be applied to the computing device 100. The input unit 150 formed of a touch screen may include a touch sensor. The touch sensor may be configured to convert a change in pressure applied to a specific region of the input unit 150 or electrostatic capacity generated in a specific region of the input unit 150 into an electric input signal. The touch sensor may be configured to detect not only the touched position and area, but also the pressure at the time of touch. When a touch input is made to the touch sensor, a signal(s) corresponding to the touch input is transmitted to a touch controller. The touch controller processes the signal(s) and then transmits data corresponding to the signal(s) to the processor 120. Accordingly, the processor 120 may recognize a touched region of the input unit 150 and the like.

In an embodiment of the present disclosure, a server may also include other configurations for performing a server environment. The server may include all of the predetermined (or selected, for other embodiments) types of devices. The server is a digital device, and may be a digital device, such as a laptop computer, a notebook computer, a desk top computer, a web pad, a mobile phone, which is equipped with a processor, includes a memory, and has computing capability.

The server (not illustrated) performing the operation for providing the user interface for reading the chest image according to the embodiment of the present disclosure to the user terminal may include a network unit, a processor, and a memory.

The server may generate the user interface according to the embodiments of the present disclosure. The server may be a computing system which provides a client (for example, a user terminal) with information through a network. The server may transmit the generated user interface to the user terminal. In this case, the user terminal may be a predetermined (or selected, for other embodiments) type of computing device 100 which is capable of accessing the server. The processor of the server may transmit the user interface to the user terminal through the network unit. The server according to the embodiments of the present disclosure may be, for example, a cloud server. The server may be a web server processing the service. The kind of foregoing server is merely an example, and the present disclosure is not limited thereto.

Each of the network unit, the processor, and the memory included in the server according to the embodiments of the present disclosure may perform the same roles as those of the network unit 110, the processor 120, and the memory 130 included in the computing device 100 or be identically configured to the network unit 110, the processor 120, and the memory 130 included in the computing device 100.

The user terminal may display the user interface provided from the server for reading a chest image. The user terminal may include a network unit, a processor, a memory, an output unit, and an input unit. Each of the network unit, the processor, the memory, the output unit, and the input unit of the user terminal may perform the same or similar operation as those of each of the network unit 110, the processor 120, the memory 130, the output unit 140, and the input unit 150 included in the computing device 100. For example, the user interface may be displayed through the output unit of the user terminal. For example, the user interface may be displayed as illustrated in FIGS. 2 and 3. The server may transmit the generated user interface to the terminal.

In the embodiment of the present disclosure contents, the user interface may visualize and display the calculated cardiothoracic ratio together with the lung diameter and the heart diameter. For example, the user interface may display a first region displaying the lung diameter, a second region displaying the heart diameter, and a third region displaying the calculated cardiothoracic ratio. The first region, the second region, and the third region may mean independent regions or layers which are separated from one another. For another example, the first region, the second region, and the third region may be expressed while overlapping in one or two regions. For another example, the user interface may visualize the lung diameter and the heart diameter and display the cardiothoracic ratio on one region. In the embodiment of the present disclosure, the user interface may display the readout generated based on the determination whether the patient of the chest image has cardiomegaly according to the cardiothoracic ratio.

In the embodiment of the present disclosure, in response to the reception of a user adjustment input for the lung diameter and the heart diameter visualized through the user interface, the lung diameter and the heart diameter may be calculated again by adjusting the calculation criteria of the lung diameter and the heart diameter so as to correspond to the user adjustment input. Accordingly, the cardiothoracic ratio may also be calculated again according to the user adjustment input.

According to the embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a dequeue. The list may mean a series of dataset in which order exists internally. The list may include a linked list. The linked list may have a data structure including data connection in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The dequeue may have a data structure that may process data at both ends of the data structure.

The non-linear data structure may be the structure in which the plurality of pieces of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined (or selected, for other embodiments) configuration elements among the disclosed configurations. That is, the data structure including the neural network may include the entirety or a predetermined (or selected) combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined (or selected, for other embodiments) other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes." The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network. (in the present specification, weights and parameters may be used with the same meaning.) Further, the data structure including the weight of the neural network may be stored in the computer readable medium. The neural network may include a plurality of weights. The weight is variable, and in order for the neural network to perform a desired or a selected function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 4:
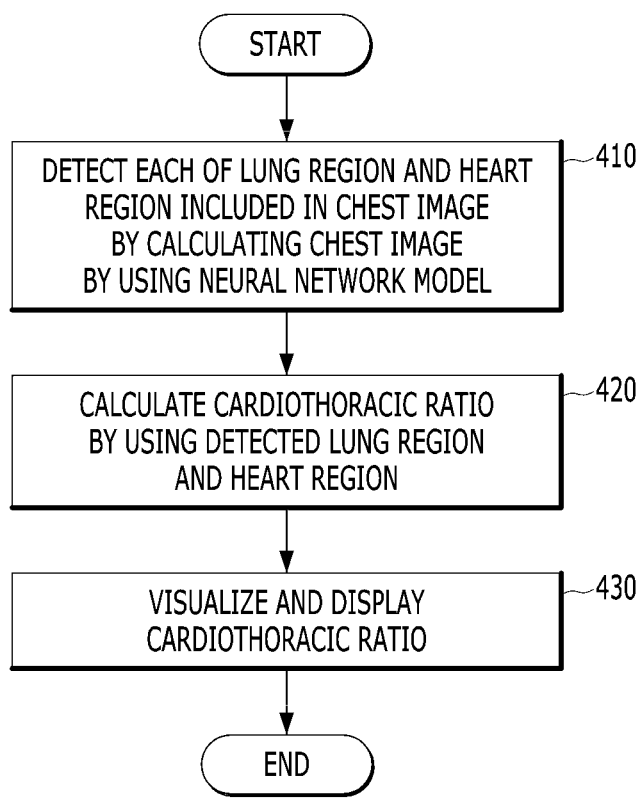
FIG. 4 is a flowchart illustrating a method of reading a chest image according to an embodiment of the present disclosure.

FIG. 4 is a flowchart illustrating a method of reading a chest image according to an embodiment of the present disclosure.

The computing device 100 may detect a position of a rib included in the chest image by calculating the chest image by using the neural network model. The computing device 100 may determine a respiratory level of a lung according to the position of the rib. The computing device 100 may determine whether or not to identify presence of cardiomegaly for the chest image by the respiratory level of the lung.

The computing device 100 may classify the chest image into a PA image or an AP image. The computing device 100 may perform classification the chest image according to whether a photographic target (that is, an examinee) of the chest image is an adult. The computing device 100 may classify the chest image by using meta data matched with the chest image and stored. The computing device 100 may differently apply cardiothoracic ratio criteria for determining the chest image as cardiomegaly according to the result of the classification of the chest image (for example, the result of the classification according to whether the chest image is the PA image of the adult). For example, when the chest image is classified into the AP image or the chest image is not the image of the adult, the computing device 100 determines to identify presence of cardiomegaly for the chest image, and apply a cardiothoracic criteria for determining that the chest image is the cardiomegaly differently from a cardiothoracic criteria corresponding to the PA image of the adult.

The computing device 100 may detect a spinal line included in the chest image by calculating the chest image by using the neural network model. The computing device 100 may correct the chest image according to the spinal line.

The computing device 100 may detect each of a lung region and a heart region included in the chest image by calculating the chest image by using the neural network model (410).

The computing device 100 may calculate a cardiothoracic ratio by using the detected lung region and heart region (420). The computing device 100 may calculate a lung diameter that is the longest distance from a left boundary line of a left lung region included in the lung region to a right boundary line of a right lung region included in the lung region. The computing device 100 may calculate a heart diameter that is the longest diameter in the heart region. The computing device 100 may calculate the cardiothoracic ratio according to the lung diameter and the heart diameter.

The computing device 100 may visualize and display the cardiothoracic ratio (430). The computing device 100 may visualize and display the lung diameter and the heart diameter.

The computing device 100 may not display the visualized cardiothoracic ratio display in response to a user setting input.

The computing device 100 may adjust and display the visualized lung diameter and heart diameter in response to a user adjustment input. The computing device 100 may calculate the lung diameter and the heart diameter again by adjusting the criteria of the calculation of the lung diameter and the heart diameter so as to correspond to the user adjustment input. The computing device 100 may calculate the cardiothoracic ratio according to the user adjustment input again.

The computing device 100 may determine whether a patient of the chest image has cardiomegaly according to the cardiothoracic ratio. The computing device 100 may generate a readout for the chest image based on whether the patient of the chest image has cardiomegaly.

Figure 5:
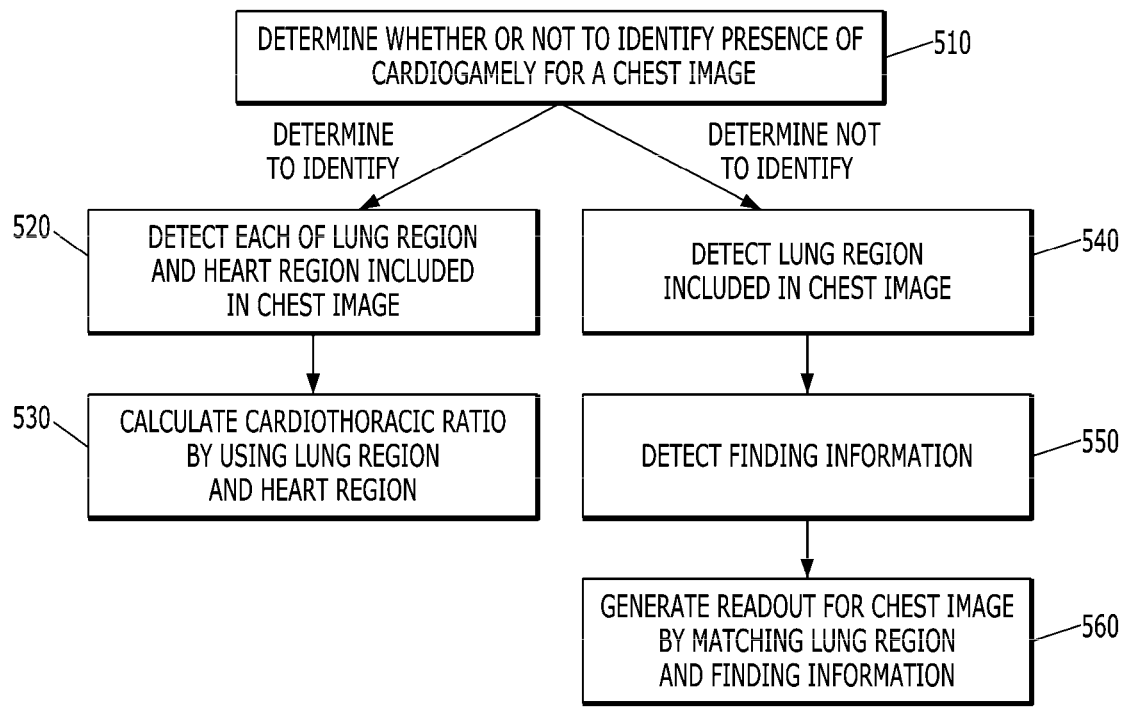
FIG. 5 is a flowchart illustrating the method of reading a chest image according to the embodiment of the present disclosure.

FIG. 5 is a flowchart illustrating the method of reading a chest image according to the embodiment of the present disclosure.

The computing device 100 may determine whether or not to identify presence of cardiomegaly for the chest image (510).

In an embodiment, the computing device 100 may classify the chest image into a first type image acquired according to a first photographic direction and a second type image acquired according to a second photographic direction different from the first photographic direction. The computing device 100 may determine whether or not to identify presence of cardiomegaly for the chest image based on a result of the classification of the chest image or age information of a photographic target of the chest image.

In the embodiment, the computing device 100 may classify the chest image into a PA image and an AP image. When the chest image is classified into the PA image and an examinee of the chest image is determined as an image of an adult, the computing device 100 may determine the chest image as the image that can identify presence of cardiomegaly. When the chest image is not the PA image of the adult, the computing device 100 may determine not to identify presence of cardiomegaly for the chest image.

In the embodiment, the image classification may be implemented by applying a predetermined (or selected, for other embodiments) image processing method on the chest image. In another embodiment, the image classification may be implemented based on meta data included in the chest image. In another embodiment, the image classification may be implemented by using a deep learning method.

In the embodiment, the computing device 100 may acquire information on a position of a rib included in the chest image, and determine respiratory level of a lung in the chest image according to the acquired information on the position of the rib. The computing device 100 may determine whether or not to identify presence of cardiomegaly for the chest image based on the determined respiratory level of the lung.

In the embodiment, when the chest image is classified as the PA image of the adult, the computing device 100 may acquire information on a position of a rib included in the chest image for determining whether or not to identify presence of cardiomegaly for the chest image, and determine respiratory level of a lung in the chest image according to the acquired information on the position of the rib. The computing device 100 may determine whether or not to identify presence of cardiomegaly for the chest image based on the determined respiratory level of the lung.

In the embodiment, when the chest image is classified into the AP image or the chest image is not the image of the adult, the computing device 100 determines to identify presence of cardiomegaly for the chest image, and determine to apply a cardiothoracic criteria for determining that the chest image is the cardiomegaly differently from a cardiothoracic criteria corresponding to the PA image of the adult.

When it is determined to identify presence of cardiomegaly for the chest image, the computing device 100 may detect each of a lung region and a heart region included in the chest image by calculating the chest image by using the neural network model (520). For example, the neural network may include a CNN, but this is merely illustrative, and a predetermined (or selected, for other embodiments) neural network which is capable of segmenting or localization of an object in an image may be included in the neural network. For example, the neural network model may include a predetermined (or selected) type of neural network having a chest image as an input of an input layer and anatomical location information or body organs (for example, a lung or a heart) as an output of an output layer.

The computing device 100 may calculate a cardiothoracic ratio by using the detected lung region and heart region (530). For example, the computing device 100 may calculate a lung diameter that is the longest distance from a left boundary line of a left lung region included in the lung region to a right boundary line of a right lung region included in the lung region. The computing device 100 may calculate a heart diameter that is the longest diameter in the heart region. The computing device 100 may calculate the cardiothoracic ratio according to the lung diameter and the heart diameter.

In addition, the computing device 100 may determine whether the chest image is related to cardiomegaly based on the calculated cardiothoracic ratio. The computing device 100 may generate a readout for the chest image based on whether the patient of the chest image has cardiomegaly.

When it is determined not to identify presence of cardiomegaly for the chest image, the computing device 100 may detect the lung region included in the chest image (540). When it is determined not to identify presence of cardiomegaly for the chest image, the computing device 100 may perform an operation of detecting the lung region without terminating the process. The computing device 100 may determine to match the detected lung region and finding information acquired from a finding detection network. In the embodiment, the finding detection network may receive the chest image, and output at least one of anatomical location information of the lesion indicating a part of the lung in which the lesion is present, information on the type of detected lesion (for example, pleural effusion, pneumothorax, sclerosis, nodule, and interstitial shadow), and reliability information on the detection result. The finding information is the information output from the finding detection network, and may include at least one of anatomical location information of the lesion indicating a part of the lung in which the lesion is present, information on the type of detected lesion (for example, pleural effusion, pneumothorax, sclerosis, nodule, and interstitial shadow), and reliability information on the detection result. In the embodiment, the finding detection network may include a CNN, but this is merely illustrative, and a predetermined (or selected, for other embodiments) neural network which is capable of classifying, segmenting or localizing of an object within an image may be included in the finding detection network.

The computing device 100 may generate a readout about the chest image based on the matching of the finding information and the lung region (550). In the embodiment, the matching of the finding information acquired from the finding detection network and the lung region may be performed by using a predetermined (or selected, for other embodiments) image processing algorithm, deep learning algorithm, or a rule-based algorithm based on location information. By matching the finding information and the lung region information, the readout information representing clinical significance in a situation where a specific lesion is present at a specific location in the lung region may be generated.

As described above, the computing device 100 preemptively determines whether or not to identify presence of cardiomegaly for the chest image, so that the cardiothoracic ratio may be more efficiently calculated, and computing resources consumed for the calculation of the cardiothoracic ratio may be saved and accuracy of the calculation of the cardiothoracic ratio may be improved. Further, even when it is determined not to identify presence of cardiomegaly for the chest image, the computing device 100 matches the lung region information and the finding information without terminating the process, thereby generating readout information including clinical significance of a lesion. Accordingly, since the type of output data obtainable from input data may be diversified and changed, efficiency for a medical image analysis system may be increased, and users who use the corresponding program are capable of utilizing various types of readout information, so that experience of the users may be improved.

Figure 6:
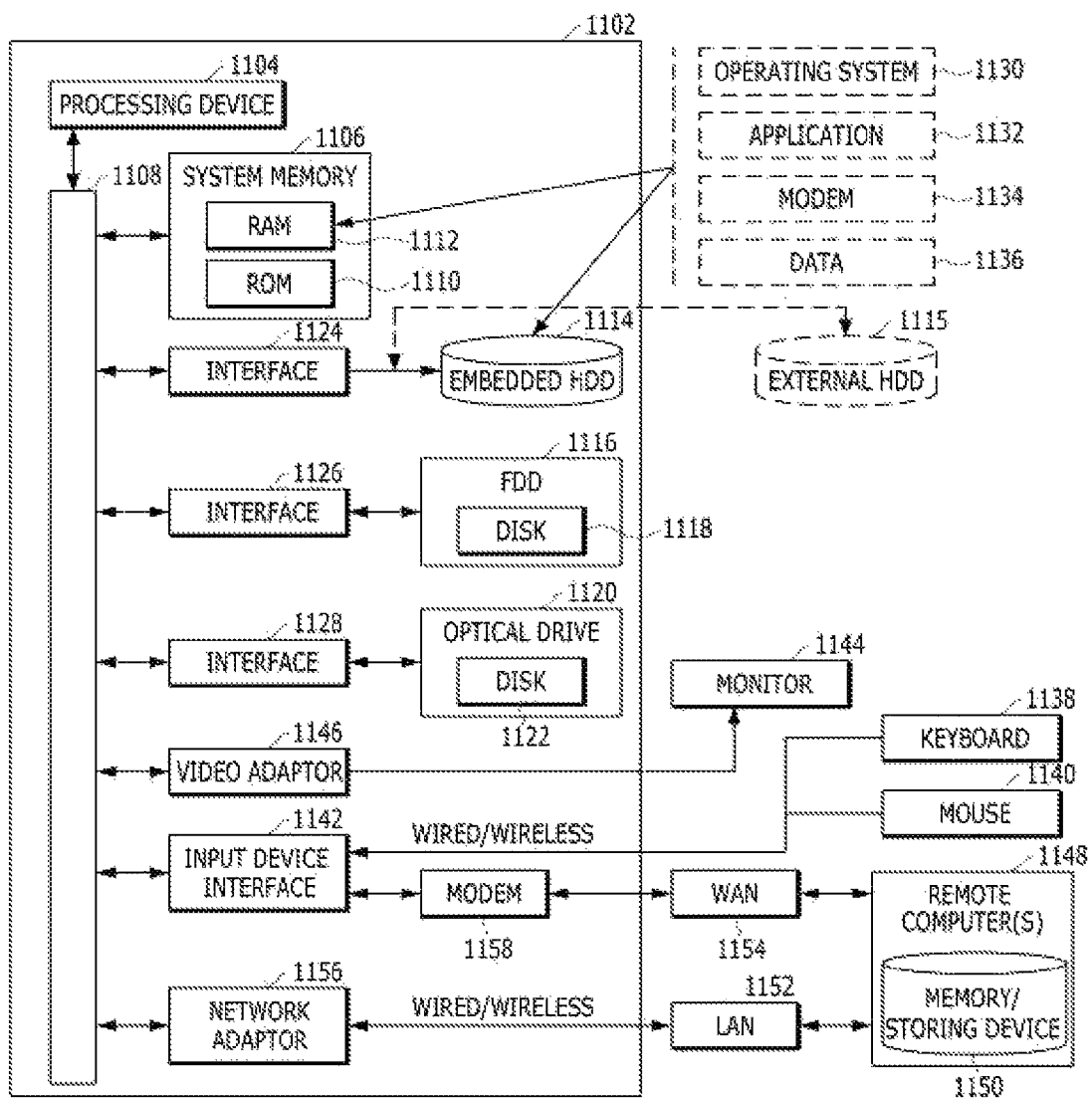
FIG. 6 is a block diagram of a computing device according to an embodiment of the present disclosure.

FIG. 6 is a simple and normal schematic view of a computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined (or selected, for other embodiments) tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired or selected information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined (or selected, for other embodiments) data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined (or selected, for other embodiments) media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined (or selected) technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to read a chest image, the method comprising:
   determining whether or not to identify presence of cardiomegaly for the chest image;
   detecting a lung region and a heart region respectively which are included in the chest image, using a neural network model, when it is determined to identify the presence of cardiomegaly for the chest image; and
   calculating a cardiothoracic ratio of the chest image using the detected lung region and the detected heart region,
   wherein the determining whether or not to identify presence of cardiomegaly for the chest image comprising:
      detecting a position of a rib included in the chest image using the neural network model;
      determining a respiratory level of a lung according to the detected position of the rib; and
      determining whether or not to identify presence of cardiomegaly for the chest image based on the determined respiratory level of the lung.

2. The method of claim 1, wherein the determining whether or not to identify presence of cardiomegaly for the chest image comprising:
   classifying the chest image as a first type image acquired according to a first photographic direction or a second type image acquired according to a second photographic direction different from the first photographic direction; and
   determining whether or not to identify presence of cardiomegaly for the chest image, based on the classification result of the chest image and age information on a photographic target of the chest image.

3. The method of claim 1, wherein the determining whether or not to identify presence of cardiomegaly for the chest image comprising:
   classifying the chest image as a posterior anterior (PA) image or an anterior posterior (AP) image; and
   determining to identify presence of cardiomegaly for the chest image, when the chest image is the PA image and an image of an adult.

4. The method of claim 3, wherein the determining whether or not to identify presence of cardiomegaly for the chest image further comprising:
   determining not to identify presence of cardiomegaly for the chest image, when the chest image is the AP image or the chest image is not an image of an adult.

5. The method of claim 3, wherein the determining whether or not to identify presence of cardiomegaly for the chest image further comprising:
   determining to identify presence of cardiomegaly for the chest image, and applying cardiothoracic ratio criteria for determining cardiomegaly differently from cardiothoracic ratio criteria corresponding to a PA image of an adult, when the chest image is the AP image or the chest image is not an image of an adult.

6. The method of claim 3, wherein the classifying the chest image as the posterior anterior (PA) image or the anterior posterior (AP) image comprising:
   classifying the chest image as the PA image or the AP image using metadata which is matched on the chest image and stored.

7. The method of claim 1, wherein the method further comprising:
   detecting the lung region included in the chest image by calculating the chest image using the neural network model, and matching the detected lung region with finding information detected from a finding detection network, when it is determined not to identify presence of cardiomegaly for the chest image; and
   generating a readout about the chest image based on the matching of the finding information and the lung region.

8. The method of claim 1, wherein the method further comprising:
   detecting a spinal line included in the chest image by calculating the chest image using the neural network model; and
   correcting the chest image according to the detected spinal line.

9. The method of claim 1, wherein the calculating the cardiothoracic ratio of the chest image using the detected lung region and the detected heart region comprising:
   calculating a lung diameter, which is the longest distance from a left boundary line of a left lung sub region included in the lung region to a right boundary line of a right lung sub region included in the lung region;
   calculating a heart diameter, which is the longest diameter in the heart region; and
   calculating the cardiothoracic ratio according to the lung diameter and the heart diameter.

10. The method of claim 9, wherein the method further comprising:
    generating a user interface for visualizing and displaying the calculated cardiothoracic ratio together with the lung diameter and the heart diameter; and
    transmitting the generated user interface to a terminal.

11. The method of claim 10, wherein the method further comprising:

receiving a user adjustment input for the visualized lung diameter and the visualized heart diameter;

recalculating the lung diameter and the heart diameter by adjusting calculation criteria of the lung diameter and the heart diameter so as to correspond to the user adjustment input; and recalculating the cardiothoracic ratio according to the user adjustment input.

12. The method of claim 1, wherein the method further comprising:

determining whether it is cardiomegaly or not from the chest image according to the calculated cardiothoracic ratio; and generating a readout about the chest image based on the determination whether it is cardiomegaly or not.

13. A server, comprising:

a processor comprising one or more core;

a network unit; and a memory, wherein the processor is configured to:

determine whether or not to identify presence of cardiomegaly for a chest image;

detect a lung region and a heart region respectively which are included in the chest image, by using a neural network model, when it is determined to identify presence of cardiomegaly for the chest image;

calculate a cardiothoracic ratio of the chest image using the detected lung region and the detected heart region;

detect a position of a rib included in the chest image using the neural network model;

determine a respiratory level of a lung according to the detected position of the rib; and determine whether or not to identify presence of cardiomegaly for the chest image based on the determined respiratory level of the lung.

14. A terminal, comprising:

a processor comprising one or more core;

a memory; and an output unit providing a user interface, wherein the user interface displays information on whether or not to identify presence of cardiomegaly for a chest image, wherein the user interface visualizes and displays a cardiothoracic ratio of the chest image, calculated using a lung region and a heart region detected from the chest image, wherein the information on whether or not to identify the presence of cardiomegaly corresponds to information determined based on a respiratory level of a lung determined according to a position of a rib included in the chest image.

15. The terminal of claim 14, wherein the user interface displays a readout about the chest image, which is generated based on whether it is cardiomegaly or not determined according to the cardiothoracic ratio.

* * * * *